United States Patent [19]

Lowrance et al.

[11] Patent Number: 4,561,206

[45] Date of Patent: Dec. 31, 1985

[54] FISHING CAPSULE

[76] Inventors: Arlen J. Lowrance; Constance A. Lowrance, both of 142 E. 26th Ct., Tulsa, Okla. 74114

[21] Appl. No.: 663,567

[22] Filed: Oct. 22, 1984

[51] Int. Cl.$^4$ ............................................. A01K 91/00
[52] U.S. Cl. .................................. 43/43.11; 43/42.74
[58] Field of Search ................. 43/43.11, 42.74, 43.1, 43/4, 4.5, 44.99

[56] References Cited

U.S. PATENT DOCUMENTS

| | | | |
|---|---|---|---|
| 1,410,817 | 3/1922 | Lloyd | 43/44.99 |
| 2,727,347 | 5/1955 | Sneed | 43/43.11 |
| 2,961,793 | 11/1960 | Buchanan | 43/42.74 |
| 3,214,858 | 11/1965 | Louie | 43/43.11 |
| 3,694,951 | 10/1972 | Modeme | 43/43.11 |
| 4,262,379 | 4/1981 | Jankiewicz | 43/100 |

FOREIGN PATENT DOCUMENTS

2088681  6/1982  United Kingdom ................. 43/43.1

*Primary Examiner*—Gene P. Crosby
*Attorney, Agent, or Firm*—Robert E. Massa

[57] ABSTRACT

A fishing capsule has a hinge and a fixed arm on each side. A separate portion of fishing line is wrapped around each hinge and arm. A guide member within the capsule is attached to a pair of release arms. Each release arm cooperates with a hinge to hold that hinge in a set position. A trigger on the capsule holds the guide in a set position until struck. Release of the trigger allows the hinges to relax so that both portions of line may float free. A weight is attached to one line and a float to the other line. A timing component may be included to cooperate with the guide to permit timed release of the lines.

11 Claims, 17 Drawing Figures

FISHING CAPSULE

FIELD OF THE INVENTION

Our invention relates to fishing aids. More particularly, our invention relates to fishing aids which provide a wide range of fishing aid capabilities to the fisherman. Still more particularly, our invention relates to fishing aids, as for example, capsule members capable of being controllable in the degree of submersibility, to which a selected array of conventional fishing components may be attachable.

BACKGROUND OF THE INVENTION

Fishing is one of man's oldest activities. He fished initially to obtain additional food, using a natural object, such as a bone or sharp stone, attached to a line of natural material. The bone or sharp stone acted as a "gorge". The gorge became caught in the fish's mouth or throat, and the pre-historic fisherman pulled the fish out of the water.

Then, with the development of metals, one of man's earliest tools was the fish hook. Soon, the practice of fishing with a baited hook attached to a line was improved by attaching the line to a rod, and eventually fishing became a sport in addition to being a means of acquiring food.

Fishing tackle rapidly became more elaborate and adaptable to the particular purpose of the fisherman. Numerous publications from Roman times to the present day, have outlined the progress and development of fishing equipment and methods of fishing. As is well-known and well-advertised, many improvements and innovations have been made in every phase of fishing equipment, rods, lines, hooks, lures, weights or sinkers, reels, and floats or bobbers.

Floats, or buoys, are used primarily to provide a means for suspending a baited hook at a preferred depth in the water and for serving as a signal that a fish has taken the bait.

Prior art which was cited in a patent application for another type of fishing aid invention of ours disclosed various other signalling devices attached to fishing lines. This prior art included a reference to a Spencer Gift Catalogue, U.S. Pat. Nos. 1,410,817 to Lloyd, U.S. Pat. No. 2,163,973 to Benca et al, U.S. Pat. No. 4,147,130 to Goguel, U.S. Pat. No. 4,262,379 to Jankiewicz, and U.S. Pat. No. 4,373,288 to McCrink.

SUMMARY OF THE INVENTION

The primary object of our invention is to provide a fishing aid which is adaptable to serve a multiplicity of adjustments in a convenient and efficient manner.

Another object of our invention is to provide a fishing aid of unique construction which is easy and reliable to use.

Still another object of our invention is to provide a fishing capsule adaptable for attachment to a fishing line for chosen control of fishing depth as desired by the fisherman.

Another object of our invention is to provide a fishing aid which will permit the fisherman to have a chosen manner of signal.

Still another object of our invention is to provide a fishing capsule which is adaptable to serve as a control for a chosen portion of line and which is adaptable to release a chosen portion of line in a convenient and efficient manner as selected by the fisherman.

We have devoted a great deal of time to the study of fishing tackle, and have designed and developed equipment to give the fisherman more selectivity in placing, controlling, and retrieving his fishing lines.

With our present invention we are providing an article of fishing tackle, which we call a capsule, which is attachable to a fishing line to allow the fisherman to have selective control of the depth of his fishing by easy and quick adjustment of the fishing lines. The fisherman may choose the depth of his fishing by the adjustment of the length of the portion of line which includes a weight and the adjustment of the length of the portion of line which includes a float or retrieval buoy.

That portion of line which is attached to a weight is wrapped around a first pair of arms on the capsule, and that portion of line which is attached to a retrieval buoy is wrapped around a second pair of arms on the capsule. Then, as we shall show, the fisherman may choose the amount of line which will be unwrapped from each pair of arms. He may do this in each case by preventing a portion of line from being unwrapped. That portion of line which the fisherman does not want unwrapped is retained on the arms by a swiveled retainer arm.

Also, we have designed our fishing capsule in a manner to allow the fisherman to choose an interval of release time after the capsule enters the water until portions of line are released from their stowed positions around the arms of the capsule and allowed to move away from the capsule, a weighted portion of line to sink, and a floatable portion of line to rise.

We wish to emphasize that by the combination of factors which we have provided, that is, the ability to choose the amount of line to be released from the capsule after it enters the water and the ability to choose the time interval for release of the line, we are overcoming a serious problem of fishing, the problem of possible entanglement of portions of the fishing line.

A portion of line to which a weight is attached, a portion of line to which hooks are attached, and a portion of line to which a float or retrieval buoy may be attached, are kept from becoming entangled during a long cast. Those portions of line are wrapped around the arms of the capsule and are released only after the capsule enters the water.

Further, if the fisherman desires, especially if he wishes to fish in deep water, he may assure himself that the lines will be released only after the capsule reaches a proper depth by the control he has over the time of release of the lines.

As we shall also show, we have designed our capsule so that, if the fisherman wishes, he may adapt components of the capsule so that lines will be released either upon impact of the capsule with the water surface, or at a chosen time after the capsule touches the water surface.

We have designed our capsule to include a timing mechanism which may be adjusted or selected by the fisherman to release lines after a chosen interval of time.

But, if the fisherman desires to have the capsule release lines immediately upon impact with the water surface, with effectively no significant time interval, he may accomplish this by being able to quickly and easily remove a portion of the timing mechanism. As a means of permitting a choice of line release, we have designed our timing mechanism to comprise a first release member, or trigger, to be actuated when the capsule hits the water surface, and a guide member and plunger within the capsule and adaptable to cooperate with the trigger and with a timing component positionable within the capsule.

Our timing component, for example, may comprise a deteriorable member placed upon a platform which has a central opening. Thus, if the fisherman prefers a timed release, he places a deteriorable member on the platform, and when the capsule strikes the water, the trigger will release the guide member, and the guide member and its plunger strikes the deteriorable member with the guide member being held from a full release until reaction of the deteriorable member with water permits the plunger to move farther by entering the central opening of the platform.

We have planned our invention so that the fisherman may have a choice of deteriorable members, or water-absorbent members to use for his timing component, thereby giving him the ability to select the time interval he wishes for the full release of his lines.

If he wishes to have an immediate release of the lines, as we mentioned above, the fisherman may eliminate the deteriorable member and the guide member will be able to move through the full extent of its capability, by being unobstructed in moving through the central opening of the platform.

As we shall also show, we have provided our fishing capsule, in one embodiment, with a fishing line slip tension adjustment at a lower portion of the capsule so that quick jerks on the line, after the capsule is in the water, will cause the fishing line below the capsule to become shorter and allow the fisherman to fish at a shallower fishing depth without complete retrieval and re-casting of the capsule.

In summary, our capsule comprises a cylindrical housing having an upper hinge and a lower arm spaced apart and in longitudinal alignment on a first side of the housing, and an upper arm and a lower hinge spaced apart and in longitudinal alignment on a second side of the housing.

An upper release arm cooperates with the upper hinge to hold the hinge in a set position, and a lower release arm cooperates with the lower hinge to hold the lower hinge in a set position.

A guide member is longitudinally slidable within the housing, and is attached to the upper and lower release arms. A compression spring within the housing applies compressive force against the guide member, and a trigger on the housing may hold the guide member in a set position.

A first portion of fishing line may be wrapped around the upper arm and the lower hinge, and a second portion of line may be wrapped around the upper hinge and the lower arm.

Thus, actuation of the trigger allows the guide member to respond to the compressive force of the spring and cause the upper release arm to move out of cooperable position with the upper hinge, the lower release arm to move out of cooperable position with the lower hinge, and the first and second portions of fishing line to be released.

Any chosen fishing accouterments may be attached to the lines, but preferably, a float would be attached to the line wrapped around the upper arm and lower hinge, and a weight would be attached to the line wrapped around the lower arm and upper hinge, because these lines will then be easily unwrapped when those particular hinges are released.

Also, as we stated above, a timing component may be used to control the time interval for full release of the lines.

The housing may have attached to it a pair of line stowage retainer arms, each cooperable with one of the hinges to maintain in a stowage condition a chosen amount of line.

We have provided a retrieval float which is attachable to one line which provides a means of retrieving the fishing capsule by the use, for example, of any type of grapnel, or any suitable line and hook.

DESCRIPTION OF THE PREFERRED EMBODIMENTS

Figure 1:
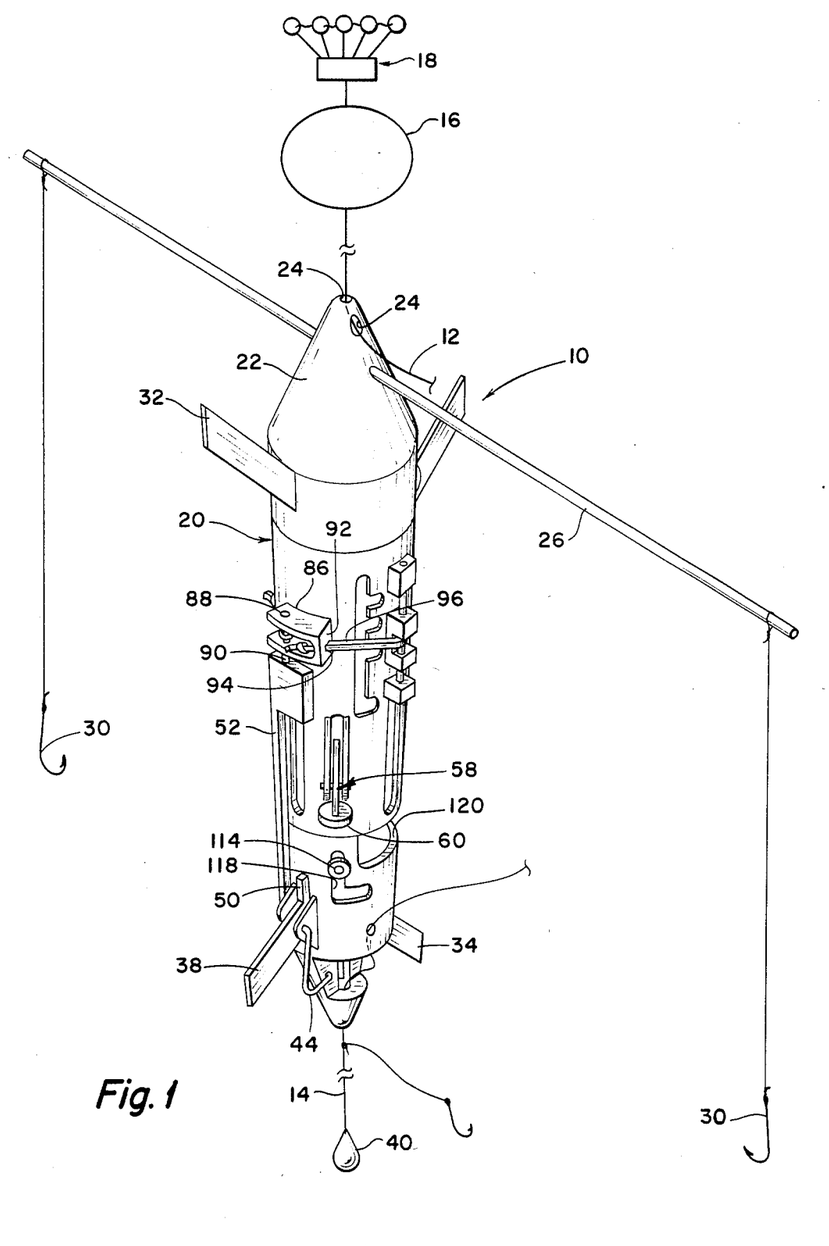
FIG. 1 is a perspective view of a fishing capsule according to our invention showing the capsule in a set position, and, for simplicity of view, not showing some line portions, and showing other line portions in a released position.

FIG. 1 is a perspective view of a fishing capsule 10, generally, according to our invention, as it would be in a set position, but, for simplicity, with some line portions and components not shown. We have shown lines and components, and the manner in which these lines and components are held in position in a schematic view of FIG. 7, and the manner in which portions of lines and components are in a released position in a schematic view of FIG. 8.

We have designed our capsule 10 to be attachable to a first portion of line 12 and a second portion of line 14 with the first portion of line 12 shown attached to a float 16 and a retrieval buoy 18.

We prefer to have line 12 directly attached to line 14 for the purpose of including and operating a slip tension adjustment member which we mentioned above. However, if the fisherman wishes, he may use separate lines 12 and 14 with each one attached to the fishing capsule 10.

Our fishing capsule 10 comprises a housing 20, generally, shown in our sketches as being cylindrical with conical portions, but housing 20 may be of any suitable conformation which permits efficient cooperation of the components we included.

At a first, or normally upper, end 22 of housing 20, we provide a passageway 24 to permit either unrestricted passage of line 12, or one convenient location for securing line 12. Then, transversely through upper portion 22, we have provided for positioning of a fishing rod 26, with fishing lines 28 attached near the ends and hooks 30 attached to lines 28.

Figure 6:
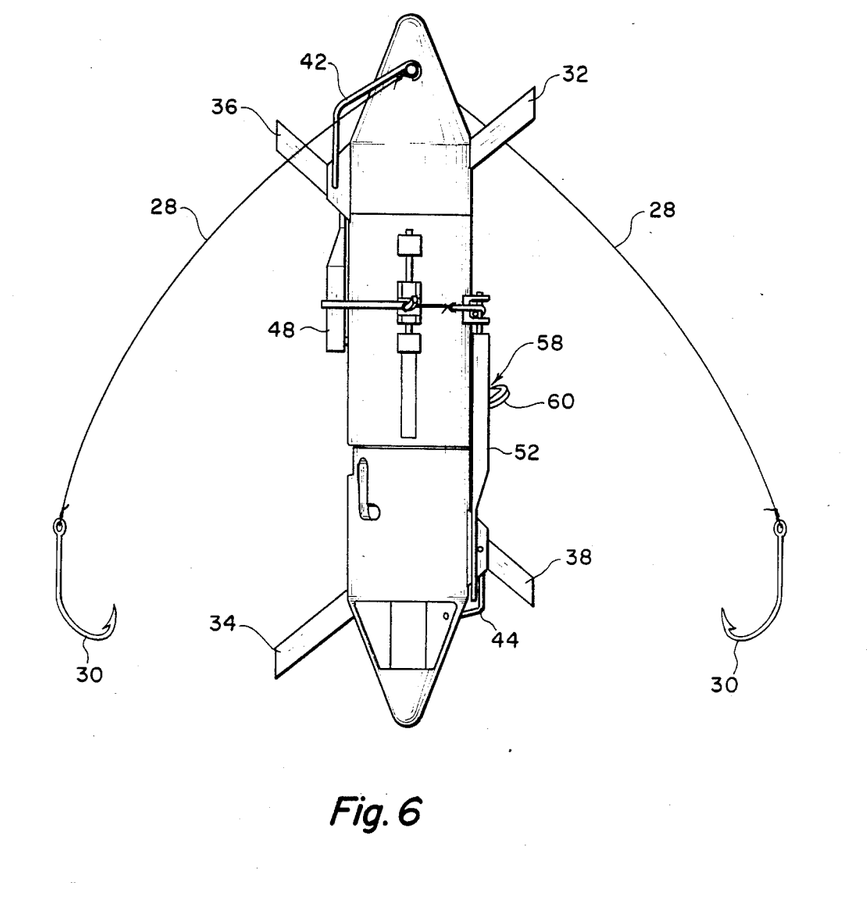
FIG. 6 is an elevational view of a fishing capsule according to our invention, but having the capsule rotated 90° from the position shown in FIG. 5.

Near the ends of the housing 20 we have placed an upper fixed arm 32, a lower fixed arm 34, an upper hinge 36, and a lower hinge 38. The conformation of the arms and hinges is shown more clearly in FIGS. 4 and 6.

As we explained above, a hinge and an arm are spaced apart longitudinally on a side of the housing, positioned to cooperate for the stowage and release of line. One portion of line 12 which includes a float member 16 may be wrapped around upper arm 32 and lower hinge 38. Thus, release of hinge 38 from an initial "set" position will permit the buoyancy of float 16 to cause line 12 to begin unwrapping, hinge 38 to swing in an upward manner, and an additional portion of line 12 to be unwrapped.

A portion of line 14 is attachable to a weight 40, and this portion of line 14 may be wrapped around upper hinge 36 and lower fixed arm 34. Thus, release of hinge 36 from an initial "set" position will permit the weight 40 easily to unwrap a chosen amount of line 14.

Figure 7:
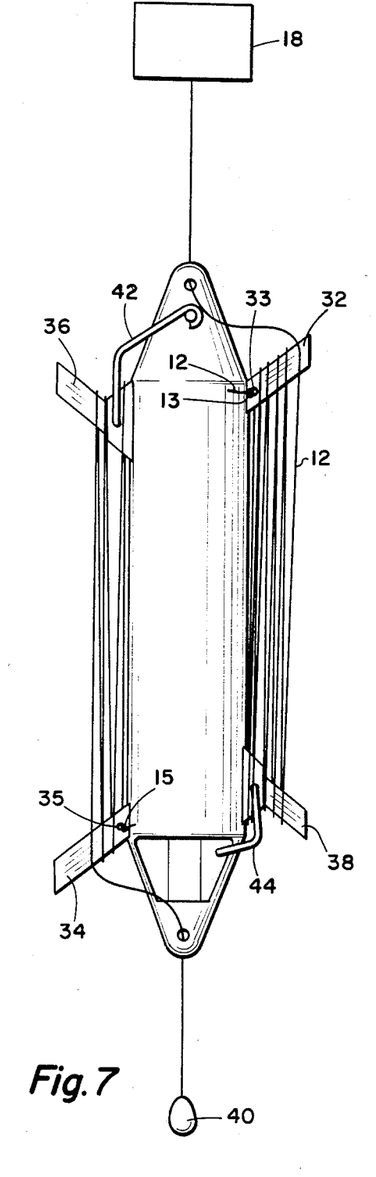
FIG. 7 is an elevational schematic view of a fishing capsule according to our invention showing lines and components as they would be immediately prior to entering the water.
Figure 8:
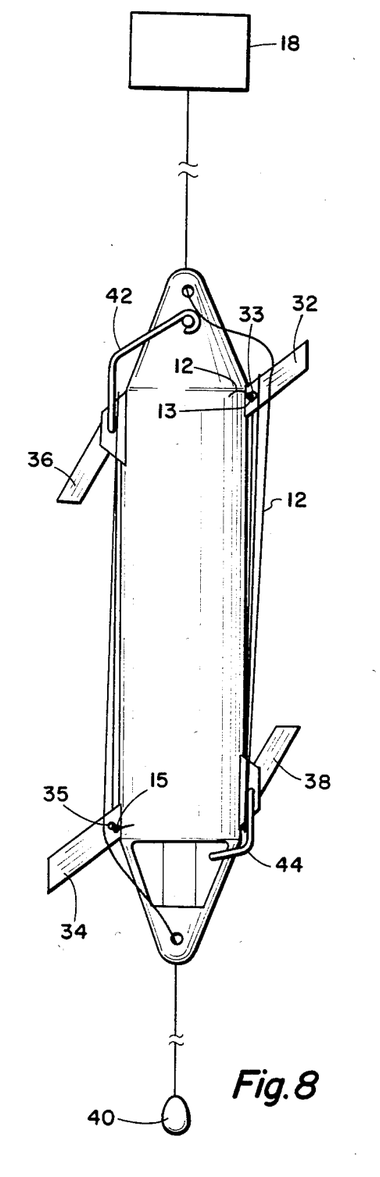
FIG. 8 is an elevational schematic view of a fishing capsule according to our invention showing lines and components as they would be immediately after release in the water.

We describe in FIG. 7 the manner in which a chosen amount of line 12 and line 14 may be allowed to unwrap. We have provided an upper line stowage retainer arm 42 cooperating with upper hinge 36, and a lower line stowage retainer arm 44 cooperating with lower hinge 36. Upper retainer arm 42 provides an attachment means for hinge 36 to housing 20 and is attachable to fishing rod 26 by means of clip 46. The fisherman may wrap, between retainer arm 42 and housing 20, that portion of line 12 which he does not want to become unwrapped in the water, and then clip retainer arm 42 in position around fishing rod 26.

He may wrap between retainer arm 44 and housing 20 that portion of line 14 which he does not want to become unwrapped in the water, and clip retainer arm 44 around a lower portion of housing 20 by a clip 46.

We show in FIG. 7 one manner of attaching lines 12 and 14 as separate lines. Line 12 passes through hole 33 and is secured by a knot 13. Line 14 passes through hole 35 and is secured by knot 15.

Upper hinge 36 may be held in a set position by an upper release arm 48 which cooperates with hinge 36 and is adaptable to hold hinge 36 in position because an upper slender portion of release arm 48 is slidable against a flat inner end of hinge 36 and occupies most of the space between hinge 36 and housing 20 so that hinge 36 will not be allowed to swivel while release arm 48 is in position. Then, when release arm 48 slides downwardly out of contact with hinge 36, hinge 36 is allowed to swivel and a chosen portion of line 14 will slip from its position around hinge 36 and fixed arm 34, as suggested in FIG. 8.

In a similar manner, an end portion 50 of lower release arm 52 is slidable between a flat inner end of lower hinge 38 and housing 20 as shown in FIG. 1, to keep hinge 38 from swivelling while set. Then, when release arm 52 slides downwardly upon actuation of the capsule, end portion 50 moves from its position between hinge 38 and housing 20 to permit hinge 38 to swivel upwardly and a chosen portion of line 12 to slip from its position around hinge 38 and fixed arm 32, also as suggested in FIG. 8.

We wish now to describe the components we have assembled to control the actuation of the release arms 48 and 52 and the desired lines.

Preferably, housing 20 should be cylindrical in shape for ease of manufacture, assembly, and operation.

Figure 3:
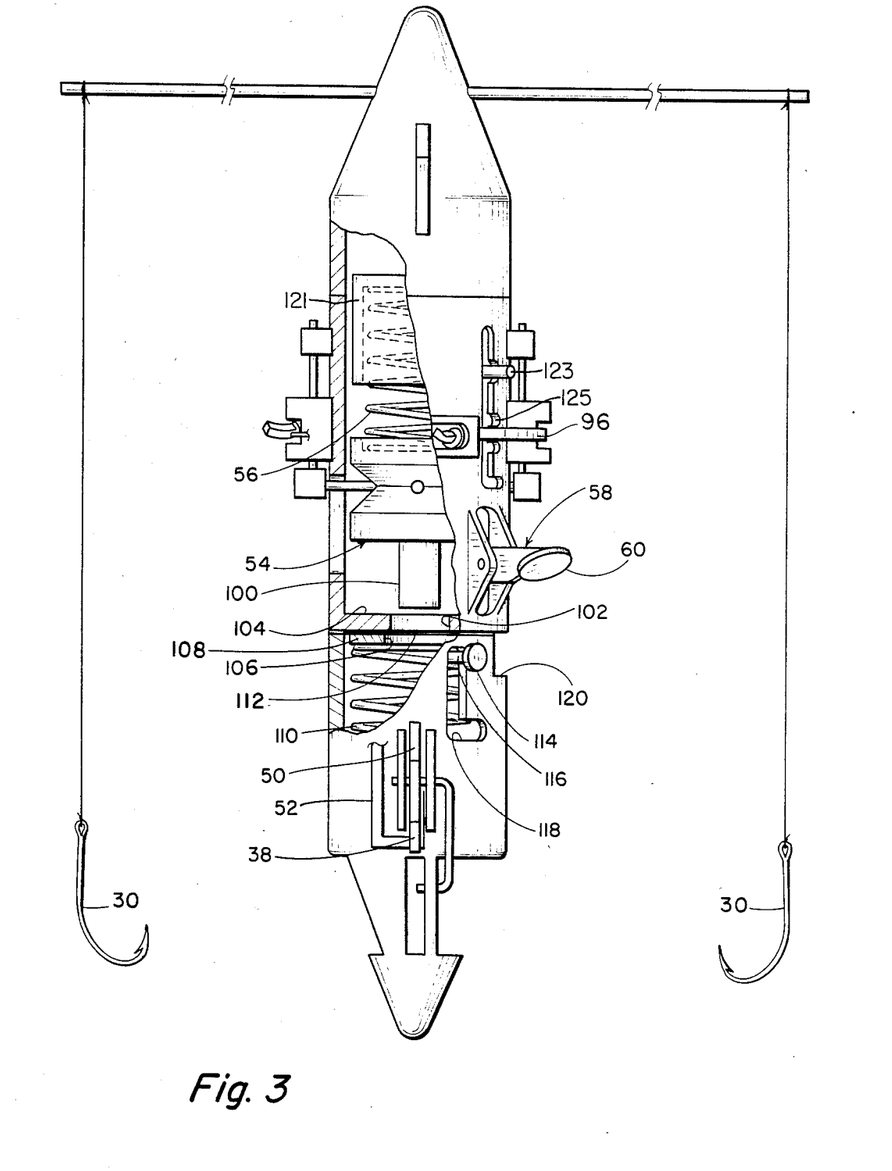
FIG. 3 is an elevational view of a fishing capsule according to our invention, similar to the view shown in FIG. 2, with a cutaway portion to show the cooperation of interior components.
Figure 10:
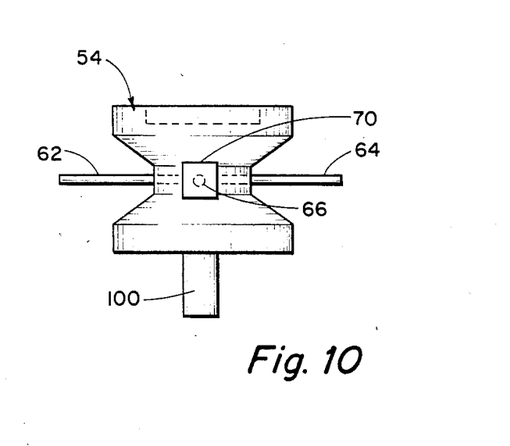
FIG. 10 is an elevational view of a guide member component of a fishing capsule according to our invention as it would be in position within the capsule as in FIG. 4.
Figure 11:
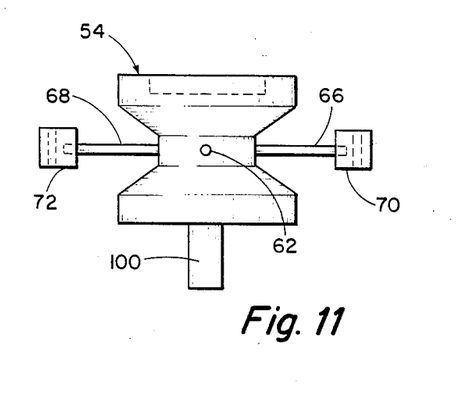
FIG. 11 is an elevational view of a guide member component of a fishing capsule according to our invention as it would be in position within the capsule as in FIG. 2.

Within housing 20, we are providing a cylindrical guide member 54, generally, which we show in position in FIG. 3 and in detail in FIG. 10 and FIG. 11. Guide member 54 is closely fitted slidably within housing 20, and is urged downwardly by compression spring 56. A first release member, or trigger, 58, generally, attached exteriorly of housing 20 and extending through housing 20, is adaptable to cooperate with the guide member 54 by leverage action to hold the guide member in a set position, and includes a disk member 60 which is intended to strike the water surface to cause trigger 58 to actuate when capsule 10 is launched.

Figure 4:
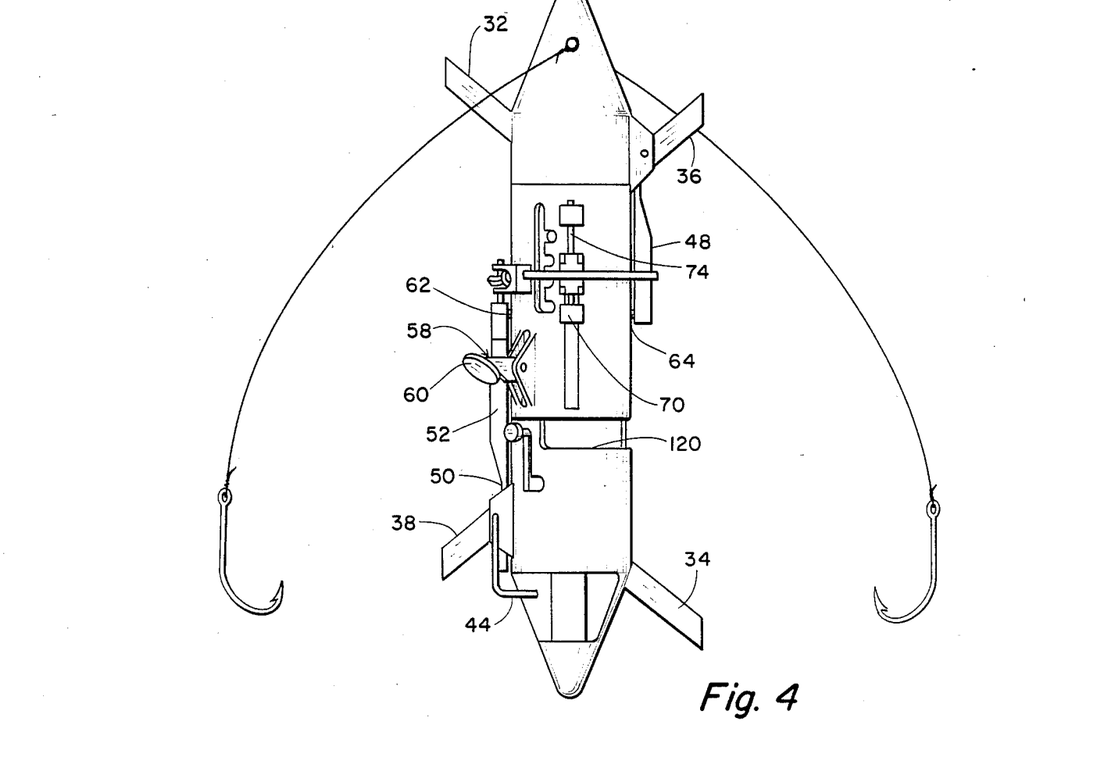
FIG. 4 is an elevational view of a fishing capsule according to our invention, but having the capsule rotated 90° from the position shown in FIG. 2.
Figure 5:
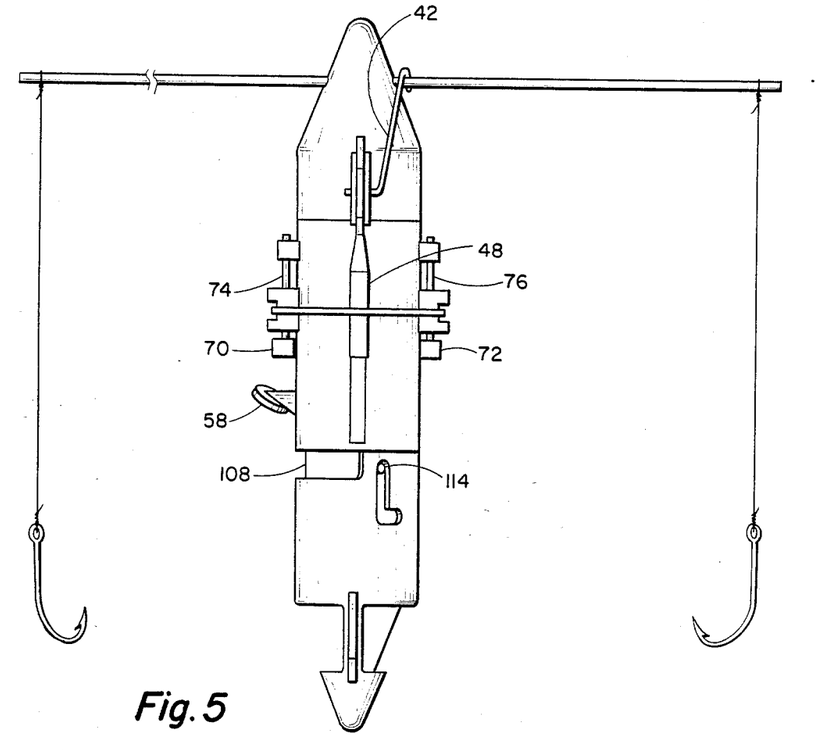
FIG. 5 is an elevational view of a fishing capsule according to our invention, but having the capsule rotated 90° from the position shown in FIG. 4.

Guide member 54, generally, also has attached to it one set of side extension arms 62 and 64, and a second set of extension arms 66 and 68. Extension arm 62 is attached to lower release arm 52, and extension arm 64 is attached to upper release arm 48 as shown in FIG. 4. This attachment may be accomplished by suitable gluing, welding, crimping, or other conventional means.

Extension arms 66 and 68 are, respectively, inserted into attachment members 70 and 72 to which pins 74 and 76 are attached.

Pin 74 moves slidably through members 78 and 80 which support and guide pin 74. Pin 76 moves slidably through members 82 and 84 which support and guide pin 76. Then, member 86, generally, secured on the housing 20, has a pair of parallel holes through which a pin 90, inserted in the end of lower release arm 52, may pass slidably. And, in the end wall 92, is an opening 94.

Thus, as shown in a "set" position in FIGS. 1 through 6, a tensionable member 96, such as a rubber band or a suitable spring-like member, is positionable within member 86 (held by a knot, for instance, if the tensionable member is a rubber band) and surrounding the member 78, upper release arm 48, member 82, and attachable tensionably around pin 90 by means of hook 98.

In a set position of the capsule, members 80 and 84 provide a set position for pins 74 and 76 through which the fisherman may attach suitable fish hooks, as, for example, hooks 30. Then, upon slight initial release of the pins 74 and 76, these hooks 30 may be quickly released.

FIGS. 3, 10, and 11 describe the geometry of guide member 54, generally, and are used to show plunger 100 which is adaptable to pass through an opening 102 in lower wall 104, and an opening 106 in a disk-like platform member 108. Platform 108 moves slidably within a lower end of the capsule, and a compression spring 110 urges platform 108 upwardly against wall 104.

Platform 108 provides a positioning and securing means for a timing component 112 of our capsule which is chosen to retard the movement of plunger 100 for a specified time and thereby control the full release of guide member 54 and consequently the release of tensionable member 96. As we stated above, actuation of trigger 58 initiates release of guide member 54. Upon this initial release, guide member 54 is urged against timing component 112, and rests against timing component 112 which may be a form of deteriorable paper, water-soluble chemical or disintegrable tablet, or water-absorbent material. Thus, timing of the movement of the plunger may be selected by the choice of deteriorable paper of suitable deterioration rate, chemical tablets of suitable disintegration rate, or water-absorbent material which has a chosen rate of relaxation to permit the plunger to enter opening 106.

We have provided an adjustment knob 114 on stem 116 cooperable with platform 108 in a manner to move platform 108 downwardly from wall 104, with stem 116 adaptable to move in slot 118, in order that a timing component 112 may be easily inserted through side opening 120 and placed on platform 108. Then, platform 108 may be re-positioned against wall 104. Spring retainer 121 seats the upper end of spring 56, and has an adjustment pin 123 positioned in one of a plurality of slots 125, for adjusting the Compressive force of spring 56.

Figures 9A, 9B, 12, 12A:
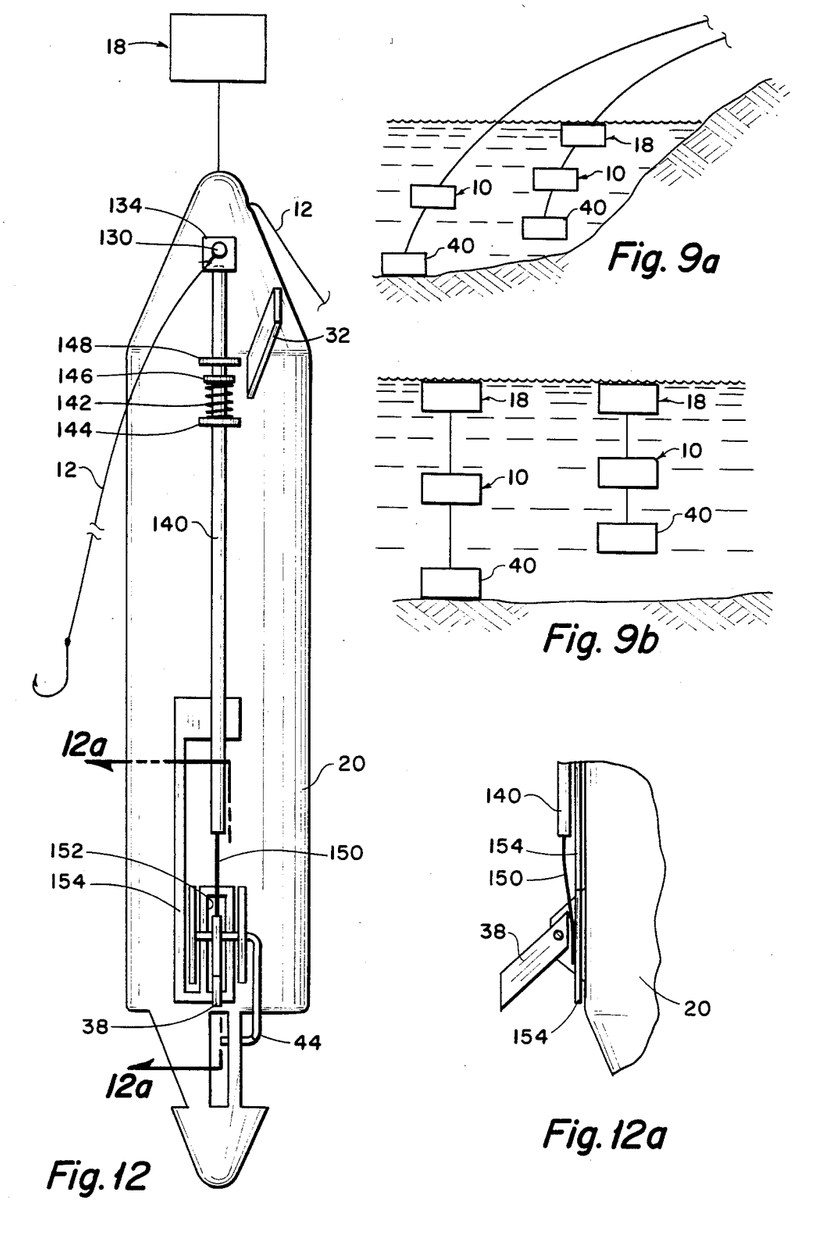
FIG. 9a is a block diagram demonstrating two modes of fishing from a bank with a rod using a fishing capsule according to our invention.
FIG. 9b is a block diagram demonstrating two modes of fishing without a rod using a fishing capsule according to our invention.
FIG. 12 is an elevational view, partially schematic, of a fishing capsule according to our invention, showing a modified form of release.
FIG. 12a is a fragmentary view, along the lines 12a—12a of FIG. 12, describing the modified release embodiment shown in FIG. 12.

FIG. 9a describes two modes of fishing from a bank with a rod. In the first mode, the retrieval buoy 18 is not used. The weight 40 rests on the bottom of the body of water and the capsule 10 is made to float, or, is held, at a chosen depth.

In the second mode, the buoyancy of the retrieval buoy 18 (and perhaps an additional float 16), is chosen to overcome the downward pull by weight 40, so that capsule 10 may float at any chosen depth.

FIG. 9b describes two different modes of fishing without a rod. In each, the line portions are chosen for that particular mode. Thus, in the first mode the weight rests on the bottom of the body of water. In the second, the weight is held off the bottom by the buoyancy of the system. In both of these modes the retrievel buoy 18 is at the surface.

FIG. 1 describes a retrievel buoy 18 as it would appear upon entering the water. Then FIG. 1a describes the retrieval byoy as it would be after assuming it is released upon the surface of the water.

Figure 1A:
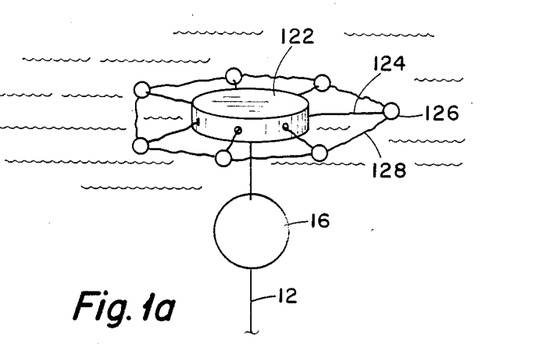
FIG. 1a is a perspective view, partially schematic, of retrieval portions according to our invention, as they would be in an actuated condition.
Figure 2:
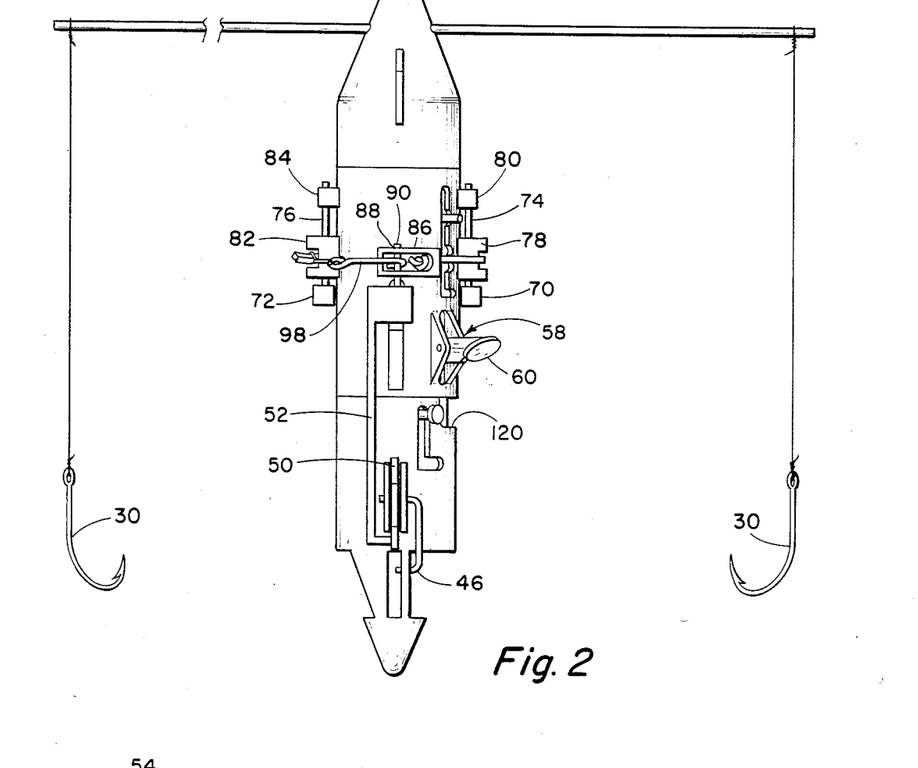
FIG. 2 is an elevational view of a fishing capsule according to our invention from a first side, showing the capsule in a position as it is shown in FIG. 1.

Retrieval buoy 18, generally, comprise a floatable ring member 122 to which are swivelled a series of wire members 124, each having a small float 126 attached thereto, and each float 126 connected to the next by a line 128. Then, on the surface as shown, the retrieval buoy 18 may be easily captured by any convenient type of grapnel or hook.

In FIGS. 12, 12a, 13, and 13a, we are describing a modified form of our fishing capsule.

Figures 13, 13A:
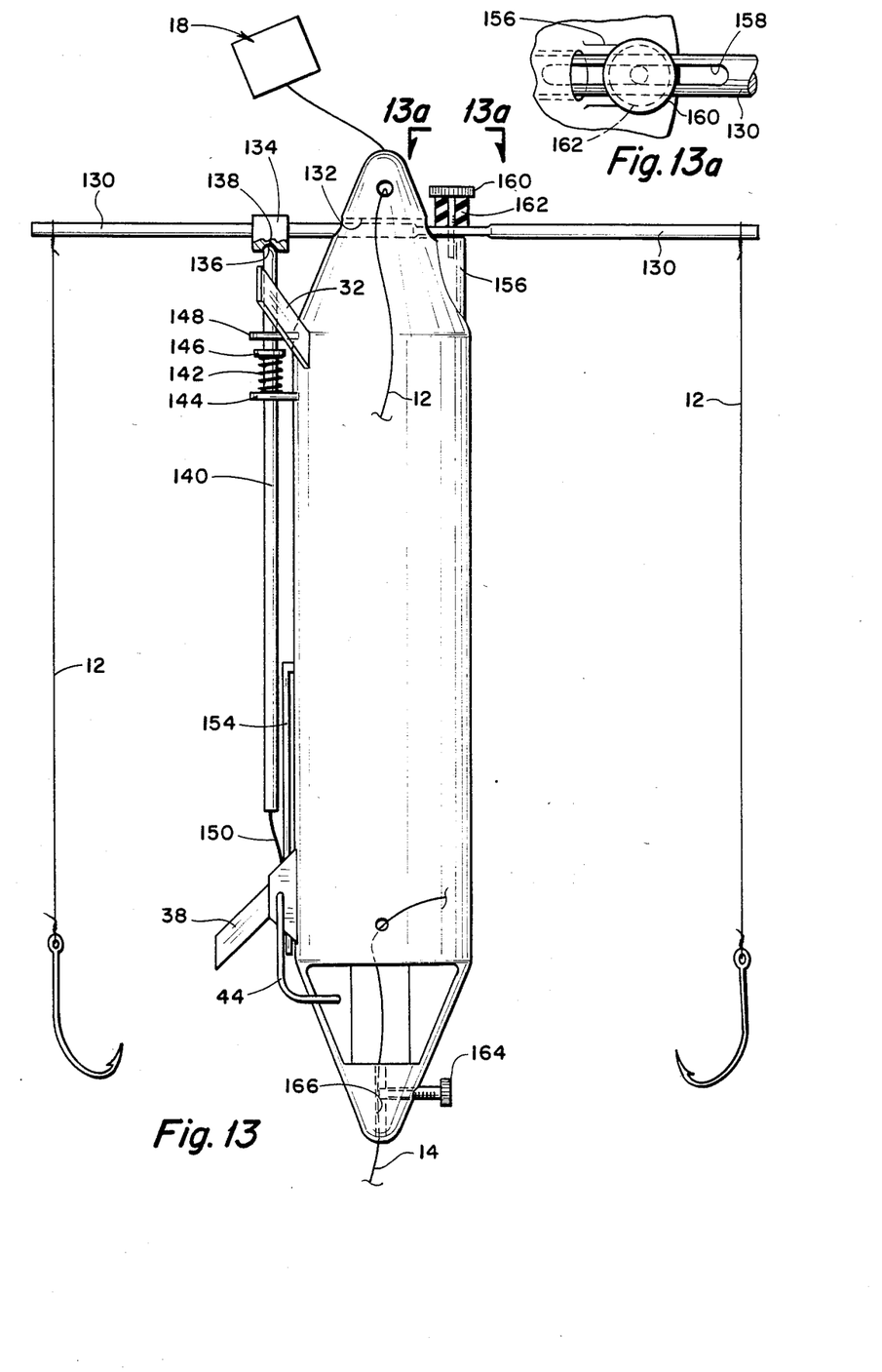
FIG. 13 is an elevational view of the modified form of our invention shown in FIG. 12, but having the fishing capsule rotated 90° from the position shown in FIG. 12, and also shown partially in section.
FIG. 13a is a top view of one adjustment component of our invention.

In FIGS. 12 and 13, we show those figures partially and schematically with the understanding that other components are as described and shown above.

Then, a fishing rod 130 slips loosely through passageway 132, and is secured to a keeper pad 134 which includes a small indentation 135 into which a rounded end 138 of spring-compressed release rod 140 may be positioned when the device is "set". Rod 140 is placed under compression by means of a compression spring 142 compressed between bracket 144 on the housing 20 and a stop member 146 secured on rod 140. When rod 140 is pulled out of position against keeper pad 134, spring 142 urges stop member 146 against bracket 148 as a restriction in the upward movement of the rod 140.

Rod 140 includes a spring pin 150 at its lower end which is adaptable to be positionable above a slot 152 in a modified lower release arm 154. In a set position, that is, with lower release arm 154 positioned in its uppermost position, rounded end 138 fitted into indentation 136, and spring pin 150 covering slot 152, then hinge 38 is held in its rigid, extended position, and line 12 is maintained in place.

When rod 140 moves upwardly, spring pin 150 will move upwardly out of its covering position over slot 152 and thus hinge 38 will swivel freely through slot 152 and permit line 12 to be released. In this action, hinge 38 will be allowed to swivel without depending upon the timed release of timing component 112. In this manner of release of line 12, timing component is not actuated.

We have chosen the temper of spring pin 150 to be such that it will not prevent a timed release of hinge 38 as controlled by timing component 112.

For example, when actuation of timing component 112 causes downward movement of guide member 54 and lower release arm 154, spring pin 150 may remain in its set position, but is sufficiently flexible to permit hinge 38 to swivel and line 12 to be released.

In a set position, as we show in FIG. 12a, spring pin 150 rests against portions of lower release arm 154 at each end of slot 152. But, when release arm 154 moves downwardly out of position, upon actuation, spring pin 150 does not rest against release arm 154.

In FIGS. 13 and 13a we show means of adjusting release tension of fishing rod 130 and slip tension of line 14.

Rod 130 rests against a bracket 156 and includes a slot 158. A drag screw 160 extending through a rubber spacer 162 has threaded engagement with bracket 156. Slot 158 permits movement of rod 130 by a pull on line 12 as described above. Drag screw 160 may be adjusted into bracket 156 to adjust friction of rubber spacer 162 against rod 130.

In FIG. 13 we show a slip tension adjustment screw 164 cooperating with threads in a lower of housing 20 to adjust the tension of line 14 within passageway 166. This adjustment of line 14 gives the fisherman the ability to retrieve line 14 below the fishing capsule up to the fishing capsule. This feature is useful in retrieving the fishing capsule from shore and to guide the fishing capsule above snags. With quick jerks of the fishing rod, the fisherman may easily adjust the depth of the fishing capsule to a more shallow depth without complete retrieval of the fishing capsule.

Since many different embodiments of this invention may be made without departing from the spirit and scope thereof, it is to be understood that the specific embodiments described in detail herein are not to be taken in a limiting sense, since the scope of the invention is best defined by the appended claims.

We claim:

1. A fishing capsule, comprising:
    a housing,
    a hinge and an arm spaced apart on a side of the housing,
    a portion of line wrappable around the hinge and the arm, means for holding the hinge in a set position,
    a guide member movable within the housing and attached to the means for holding the hinge,
    a compression spring within the housing adaptable to apply compressive force against the guide member,
    a first release member on the housing adaptable to cooperate with the guide member to hold the guide member in a set position, and
    a second release member on the housing adaptable to hold a portion of line in a set position,
    so that actuation of the first release member allows the guide member to respond to the compressive force of the spring and cause the means for holding the hinge in a set position to move out of cooperable position with the hinge, the second release member to be released from its set position, and the portion of line to be released.

2. A fishing capsule as described in claim 1, wherein: the means for holding the hinge in a set position includes a release arm.

3. A fishing capsule as described in claim 2, wherein: the hinge and the arm are in longitudinal alignment.

4. A fishing capsule as described in claim 3 which includes:
    an upper hinge and a lower arm spaced apart and in longitudinal alignment on a first side of the housing,
    an upper arm and a lower hinge spaced apart and in longitudinal alignment on a second side of the housing,
    an upper release arm cooperable with the upper hinge and adaptable to hold the upper hinge in a set position,
    a lower release arm cooperable with the lower hinge and adaptable to hold the lower hinge in a set position,
    the guide member attached to the upper release arm and the lower release arm thru a first and a second opening in the housing,
    a first portion of line wrappable around the upper hinge and the lower arm, and
    a second portion of line wrappable around the upper arm and the lower hinge,
    so that actuation of the first release member allows the guide member to respond to the compressive force of the spring and cause the upper release arm to move out of cooperable position with the upper hinge, the lower release arm to move out of cooperable position with the lower hinge, and first and second portions of line to be reeleased.

5. A fishing capsule as described in claim 4 which includes:
    a platfrom member movable within the housing, spaced apart longitudinally from the guide member, and having a central opening,
    the guide member having a plunger adaptable to enter the central opening of the platform member when the guide member is in a released position,
    the housing having a side opening adjacent the platform member, and
    a timing component adaptable for positioning on the platform member thru the side opening,
    so that upon actuation of the first release member, the plunger contacts the timing component and the guide member may be held from a full release until a chosen time interval expires.

6. A fishing capsule as described in claim 5 which includes:
    an upper line stowage retainer arm cooperable with the upper hinge to maintain in a stowage condition a chosen amount of line, and
    a lower line stowage retainer arm cooperable with the lower hinge to maintain in a stowage condition a chosen amount of line.

7. A fishing capsule as described in claim 6 which includes:
    a second compression spring adaptable to apply compressive force against the platform member to urge the platform member toward the guide member.

8. A fishing capsule as described in claim 7, which includes:
    an adjustment pin adaptable to adjust the compressive spring force on the guide member extending thru a slot in the housing to permit adjustment from exteriorly of the housing, and
    a pin member attached to the platfrom member extending thru a slot in the housing to permit moving of the platform member from exteriorly of the housing for positioning of the timing component upon the platform member.

9. A fishing capsule as described in claim 8, wherein: the second release member comprises a tensionable member.

10. A fishing capsule as described in claim 1, which includes:
    a fishing rod adjustably attachable to the housing, and
    a rod member, including a spring pin extending from one end, slidably positionable on the housing and adaptable to
    hold the fishing rod ina set position, and the spring pin cooperable with the means for holding the hinge in a set position.

11. A fishing capsule as described in claim 1, which includes:
    means for adjusting release tension of the fishing rod to the housing, and
    means for adjusting slip tension of a fishing line within a passageway thru the housing.

* * * * *